United States Patent Office 2,880,189
Patented Mar. 31, 1959

2,880,189

STABLE LATEX OF AN INTERPOLYMER OF A CONJUGATED DIENE, AN UNSATURATED NITRILE, AND AN ALPHA-UNSATURATED ACRYLIC ACID, AND METHOD OF PREPARATION

Alfred L. Miller and Verle A. Miller, Dover, Del., assignors to International Latex Corporation, Dover, Del., a corporation of Delaware No Drawing. Application April 16, 1954
Serial No. 423,850

6 Claims. (Cl. 260—29.7)

The present invention relates to oil-resistant elastic polymers or elastomers and is particularly concerned with elastomers that can be employed, in latex form, to produce strong, elastic, oil-resistant films by depositing such latex on a dipping form and curing the film so deposited.

The process of depositing natural rubber from latex on a shaped dipping form so as to form a shaped elastic film, band or sheet has been widely employed to produce a variety of useful products, such as gloves, tobacco pouches, overshoes, sheets, shower caps, baby pants and the like, commonly referred to as deposited latex products.

Deposited latex products are now generally made from natural rubber, which gives satisfactory service under ordinary conditions but which deteriorates and weakens when subjected to frequent or prolonged exposure to mineral or vegetable oils. This is due to the known low oil-resistance of natural rubber. Accordingly, many products that are subjected to prolonged exposure to considerable amouts of oils, such as brassieres, have not been produced as deposited latex articles even though fabrication by latex deposition is an inexpensive and efficient process. Additionally, it has been recognized that the service life of many natural rubber deposited latex products would be improved if the rubber had higher oil-resistance.

Attempts to substitute synthetic elastomers having high oil-resistance for natural rubber has been hampered by the fact that deposited latex products are cured as pure gum stocks (i.e., without the aid of reinforcing agents, such as carbon black, which require milling to be particularly effective) and the available oil-resistant synthetic elastomers have notoriously poor gum tensile strength. Consequently, a satisfactory substitute for natural rubber for latex deposition must have both high oil-resistance and high gum tensile strength.

Attempts to prepare copolymers that will form elastic films having adequate oil-resistance by varying the types or amounts of the monomers used in the polymerization have not produced a film that meets the multiple requirements desired by consumers. Thus, Buna-N rubbers (polymers of butadiene with acrylonitrile) have good oil-resistance when a substantial amount of acrylonitrile (30 percent or more) is used in making the polymer. Gum stocks of such polymers, however, are weak, as judged by ultimate tensile strength, and hence easily tear or break under relatively low stress. For example, a sample of a pure gum cured film deposited from a latex of a polymer made from 70 parts of butadiene and 30 parts acrylonitrile broke at an ultimate elongation of only 325 percent, the ultimate tensile strength of this pure gum cured stock (herein referred to as "gum tensile strength") being only 400 pounds per square inch (herein abbreviated to p.s.i.).

Other oil-resistant polymers have objectionable properties when processed as pure gum cured films. The chlorobutadiene polymer, neoprene, is widely used as a moderately oil-resistant milled stock for hoses, aprons and the like, but has disadvantages when used for the production of most articles made of pure gum cured films though it may have adequate elastic properties. In this connection, it is to be noted that some of the properties of neoprene (its tendency to crystallize or set on aging, sensitivity to light and heat accompanied by darkening, and development of odor) are accelerated or accentuated when the material is in the form of a thin sheet or film which has a large surface area relative to its mass.

Deposited latex films prepared from elastomeric copolymers prepared by polymerization of a major amount of a butadiene monomer, a lesser amount of an acrylonitrile monomer, and a relatively small amount, typically less than about 10 percent, of an ethylenically unsaturated carboxylic acid, such as methacrylic acid, have been found to be markedly superior to known diene elastomers, as judged by the combined properties of high gum tensile strength and high oil-resistance, when such films are cured as pure gum stocks by condensing carboxyl groups in the polymer with polyvalent cations. Such carboxyl containing films have no objectionable or even noticeable odor and are extremely stable even under accelerated aging conditions, such as by exposure to ultra-violet light or heating in an oven. Comparison of samples of such films with samples of neoprene and Buna-N in standard oil-resistance tests have indicated that such cured carboxyl containing films have better oil-resistance than Buna-N films of the same acrylonitrile content and have oil-resistance equal or superior to neoprene when made from monomer charges containing 20 percent or more of acrylonitrile plus methacrylic acid.

However, when prepared by recipes standardly used in the art, these copolymers have certain physical properties that are undesirable for special applications in the deposited latex field, although useful for other applications such as the production of brassieres or gloves. In particular, standardly prepared copolymers have undesirably high moduli at low elongations even when the gum tensile strength of the copolymer is in the low portion of the commercially useful range. (As used herein, the modulus is the stress or tensile force necessary to achieve the stated elongation.) Copolymers having correspondingly higher gum tensile strengths normally have correspondingly higher moduli. As can be readily understood, a high modulus, of the order of 1200 to 2000 p.s.i. at 300 percent elongation, is disadvantageous in many types of deposited latex articles, such as girdles, which must be stretched in order to get them on the body. Coincident with the requirement for a low modulus is the requirement that the article be strong and resist tearing (i.e., that it has a high gum tensile strength).

It has now been found that, when carboxylic acid containing polymers of the type described herein are prepared in polymerization systems containing unusually low concentrations of a peroxygen type of catalyst and selected amounts of modifier, typically a mercaptan, as described more fully below, and the latex of such a polymer is deposited as a film and cured in the presence of a polyacidic cation, the resulting film is both strong and relatively easily stretched.

As brought out above, it is desirable to have a deposited latex film as strong as possible and hence have as high a gum tensile strength as possible and simultaneously have as low a modulus at some intermediate elongation, such as 300 percent, as possible; accordingly, the ratio between these properties has been adopted herein as a measure of success in achieving these dual objectives. Deposited and cured films of copolymers prepared according to the present invention have ratios (of gum tensile strength to 300 percent modulus) of about 4 or more. In contrast, films identically prepared except for use of the standard relatively large amounts of catalyst have ratios of these properties of 1 to 2. Many of the copolymers made according to the present invention yield films that have 300 percent moduli below 800 p.s.i. and, at the same time, have gum tensile strengths of 3000 or more. When the copolymer is polymerized from a monomer charge containing a substantial amount, such as 20 percent or more, of a monomer that imparts oil-resistance to the polymer in addition to the carboxyl containing monomer, the resulting film is not only strong and relatively easily stretched but also has high oil-resistance. Films made from copolymers polymerized using lesser amounts of monomers that impart oil-resistance have somewhat less oil-resistance but are still considerably superior to natural rubber films in respect to this property.

The polymerization of appropriate monomers, typically butadiene, acrylonitrile and methacrylic acid, is effected in an aqueous system in which the monomers are emulsified and which contains a small amount of a peroxygen type of catalyst (as used herein, "peroxygen" or "peroxy" is used, as defined in "Chemical Abstracts," volume 39, page 5954, 1945, to denote the presence of the peroxide group, $-O_2-$). Suitable catalysts, which include inorganic peroxy-salts or compounds such as alkali persulfates, percarbonates, perborates, hydrogen peroxide and the like, decompose under the conditions used for polymerization to yield free radicals which initiate polymerization. This capacity to yield free radicals is proportional to the oxidizing power of the compound. Thus, each molecule of potassium persulfate, which has two oxidation equivalents, may be assumed to be capable of yielding two free radicals. The use of oxidation equivalents therefore affords a basis for comparing the chain initiating power of peroxy-compounds of different molecular weight.

It has been discovered, in accordance with the present invention, that elastic copolymers, having the advantageous properties referred to herein, are produced when the concentration of peroxygen catalyst is less than about 0.05 oxidation equivalent per 100 moles of total monomeric material, concentrations down to about 0.01 oxidation equivalent per 100 moles of total monomeric material being found to be effective. In terms of weight parts of a specific catalyst, potassium persulfate, the range of tested effective catalyst concentration is about 0.02 to 0.1 part by weight per 100 parts by weight of total monomeric material. Amounts of potassium persulfate in the range of 0.025 to 0.75 part have been found to be particularly effective. Advantageously the catalyst is used in conjunction with a modifier, such as a mercaptan, alkyl mercaptans containing from 10 to 16 carbon atoms being quite effective. It is desirable to use an amount of modifier selected with relation to the amount of catalyst used and generally within the range equivalent to about 0.01 to 1 mole of primary dodecyl mercaptan per 100 moles of total monomeric material (i.e., 0.05 to 4 parts by weight per 100 parts by weight of total monomeric material). Amounts in the range of 0.1 to 2 parts of weight have been found to be particularly effective. It has also been found that the use of the low concentrations of catalyst referred to above, in the preparation of higher solids latices, results in the formation of considerably less flock or pre-coagulum than that found when standard concentrations of catalyst are used, under otherwise similar polymerization conditions.

Primary dodecyl mercaptan belongs to the class of sulfhydryl compounds known to the synthetic rubber industry as "modifiers." The relative efficacy of various compounds in this group has been investigated and those skilled in the art understand how to adjust the concentration of modifier when one specific compound is substituted for another in a specified polymerization system. Modifiers suitable for use in the present invention are primary, secondary or tertiary alkyl mercaptans having from 10 to 16 carbons atoms, such as 4-n-butyl-1-octyl mercaptan, tert-decyl mercaptan, tert-hexadecyl mercaptan, n-cetyl mercaptan and di-n-butyl-n-propylcarbinthiol; xanthogens, such as bis-isopropyl xanthogen; thiophenols, such as thiocresol or alpha- or beta-thionaphthol and the like.

The monomers are emulsified with suitable emulsifiers such as the ethers and esters of polyglycols with aliphatic acids having from about 10 to 20 carbon atoms, alkyl sulfonates or sulfates and alkylaryl sulfonates where the alkyl group contains from about 10 to 20 carbon atoms, and alkylaryl polyether sulfates or sulfated monoglycerides. A particularly effective type of emulsifier has been found to be the amine salts of alkylaryl sulfonates. The polymerization system may be stabilized by the use of small amounts of stabilizers known to the art and generally is maintained above room temperature and below the boiling point of water, a temperature within the range of about 30° to 70° C. being preferred.

The above method conveniently results in the formation of the copolymer or elastomer in the form of a latex or suspension of small drops or globules. This latex can be used for the preparation of films in the form of shaped articles by depositing one or more layers of such latex on shaped dipping forms by methods known to the art, such as those disclosed in U.S. Patent No. 2,015,632, issued September 24, 1935, to A. N. Spanel.

In accordance with an aspect of the present invention, carboxyl groups in the polymer are condensed, either during or after deposition of the film, with cations of a polyvalent metal that forms a basic oxide. The considerable increase in the strength of the film that occurs as a result of such condensation is believed due to the formation of salt bridges or cross links that are formed between individual polymer molecules resulting from condensation of a polyvalent metal cation with two or more carboxyl groups. The effect of such condensation is so great that the usual vulcanization by reaction of ethylenic bonds in the polymer with reactive organic compounds, such as sulfur-containing compounds, or with elemental sulfur, is not necessary for producing a strong pure gum cured stock. Vulcanization with low amounts of sulfur or sulfur-containing compounds can frequently advantageously be employed to effect improvement of various properties, such as deformation or set. However, pure gum films that are satisfactory for many uses are produced without any sulfur.

Condensation of the carboxyl groups in the polymer with polyvalent cations can be effected in various ways. Thus, the free carboxyl group may react with an appropriate compound of the polyvalent metal, such as an oxide; or a salt of the carboxyl group with a monovalent metallic ion, such as a sodium or ammonium salt, may metathetically react with a salt of the polyvalent metal. The condensation may be effected at the time of deposition of the latex on the dipping form by coating the dipping form with a salt of a polyvalent metal prior to immersing the dipping form in a bath of latex. The salt may be deposited on the dipping form by spraying, brushing or dipping the form in a solution, such as an aqueous, acetone or alcohol solution, of a salt, such as a nitrate or chloride of the polyvalent metal. Preferably, the solvent in the salt solution is dried prior to immersion in the bath of latex to minimize contamination of the bath and to effect a uniform deposit. This method has the advantage that the salt on the form acts like a coagulant and produces a thick deposit of latex. The process can be repeated if a greater thickness of latex is desired.

Alternatively, the latex may be deposited on the form from an acid or an alkaline latex and thereafter treated with a solution of a polyvalent salt, the deposit of acid latex being neutralized prior to treatment with the salt. In still another method, the latex which is deposited on the form contains a compound of a polyvalent metal which is unreactive with the carboxyl groups at the time of deposition but which is reactive under the conditions of drying or curing, such as heating to 150 to 250° F. For example, an oxide of a polyvalent salt, such as zinc oxide, can be incorporated in an ammoniated latex prior to deposition of the latex. On drying, the zinc oxide condenses with the carboxyl groups of the polymer and ammonia and water are eliminated. Standard curing agents, such as elemental sulfur, can be incorporated in the latex prior to deposition if desired. However, it is one of the advantages of the present invention that pure gum cured films (i.e., films which have less than about 15 to 20 percent of any filler or reinforcing agent) can be produced which have a gum tensile strength of more than 2000 p.s.i. without the aid of any curing agent other than the polyvalent metal compound.

Compounds of various polyvalent metals may be used in the method described above, including compounds of tin, iron, lead, nickel, cobalt and the like. However, particularly effective results are obtained with compounds of polyvalent metals that form strongly basic oxides, such as the alkaline earth metals, calcium, barium, strontium and magnesium (metals of the group IIA of the periodic table) and zinc. Soluble salts such as nitrates, chlorides, acetates, formates and the like, can be employed where the condensation is effected at the time of deposition or by treating a deposited film. Various concentrations of the salt can be employed in such solutions.

As stated above, oxides can be employed with alkaline latices, the condensation being effected in subsequent operations such as drying or curing. The amount of the oxide required for efficient curing obviously varies with the curing agent itself, its fineness and compatibility with the polymer and with the carboxyl content of the polymer. Useful results are obtained when the amount of oxide is at least equal to the amount chemically equivalent to the carboxyl content of the polymer, taking into account salt used in dipping.

In accordance with a preferred aspect of the invention, the polymerization of the carboxyl containing polymer is effected using an emulsifier selected from the group consisting of anionic and non-ionic emulsifiers. The resulting emulsion of the polymer is then neutralized or made alkaline, such as from a pH above 7 to 11, with a monovalent base without coagulation, a salt of the monovalent base and the carboxyl groups of the polymer being formed. Since some latices tend to thicken at high pH values, it is frequently desirable to add enough base to raise the pH of the latex to a value in the lower portion of the alkaline range, generally below about 9. The neutralization is effected with a volatile or thermally unstable monovalent base, such as ammonia, methylamine, ethanolamine, morpholine, trimethylbenzyl ammonium hydroxide and the like, so that, during the drying or curing operation following deposition of the elastomer from the latex, cations of the monovalent base combined with carboxyl groups of the polymer are substantially completely replaced with cations of polyvalent metal, the monovalent base escaping as such or as its volatile decomposition products.

A finely ground oxide of a polyvalent metal oxide of the type referred to above is then incorporated uniformly throughout the neutralized emulsion. Metal oxides or hydroxides useful for this purpose are those which are unchanged at the pH of the neutralized latex and which are so insoluble that they furnish insufficient ions to coagulate or react with the neutralized latex. A particularly advantageous oxide is zinc oxide.

The neutralized emulsion or latex of the elastomer compounded with the polyvalent metal oxide can conveniently be deposited on a shaped dipping form by coating a dipping form with a solution of a salt of a polyvalent metal, such as an acetone solution of calcium nitrate, evaporating the solvent, and immersing the coated dipping form in a bath of the neutralized and compounded latex. The dry salt on the dipping form quickly causes a thick layer of the elastomer to be deposited on the dipping form. The film so formed is then dried and cured or one or more additional thicknesses of elastomer can be deposited by repeating the process and the film then dried or cured. The polyvalent salt used to precipitate the elastomer is effective in curing the elastomer by condensation of the polyvalent metal cation with the carboxyl group, thus adding to the curing effect of the basic polyvalent metal oxide compounded with the suspended elastomer.

By the use of the above technique and the elastomer described herein, a wide variety of deposited latex articles can be provided in conjunction with the dipping techniques known to the art, such as the methods disclosed in U.S. Patent No. 2,015,632, referred to above. By such methods, thin, hollow, seamless, elastic articles having film thicknesses of from about 0.005 of an inch to about 0.100 of an inch, such as baby pants, gloves, overshoes, girdles, such as those disclosed in U.S. Patent No. 2,360,-736, issued October 17, 1944, to A. N. Spanel, and other undergarments or body coverings can be advantageously made of a material that is both elastic and oil-resistant. Such materials are of particular efficacy when used for that portion of a deposited latex brassiere that contacts the skin. Such brassieres, which advantageously have preformed breast portions of deposited latex which have outwardly extending pockets and elastically conform to the shape of the breasts, are subject to the deleterious action of under arm secretions and the secretions of the human breast. Because the elastomers described herein have unusual resistance to animal and vegetable oils, brassiers made from latices of such elastomers have improved service life. Since the service life of a deposited latex brassiere is a major factor in consumer acceptance, there is a substantial advantage in the use of the elastomers described herein for such articles.

In order to illustrate the present invention but not to be construed as a limitation thereof, the following examples are given. The values of the modulus at 300 percent elongation, ultimate gum tensile strength, elongation at break and oil-resistance referred to in the examples or reported in the tables hereinafter were measured by standard methods well known to the rubber industry.

EXAMPLE I

An emulsifying agent (4 parts of Ultrawet 60–L, an amine salt of an alkylaryl sulfonate manufactured by the Atlantic Refining Co.), a chelating agent (0.05 part of ethylenediaminetetraacetic acid), a peroxygen type of catalyst (0.05 part of potassium persulfate) and about 100 parts of water were first placed in a jacketed glass lined autoclave which had previously been purged with nitrogen and evacuated. (Unless otherwise noted, all references to parts or percentages in these examples refer to parts or percent by weight.) A modifier (2.0 parts of n-dodecyl mercaptan) was then placed in the autoclave, followed by 20 parts of acrylonitrile and 7 parts of methacrylic acid. Small amounts of the ingredients previously charged to the autoclave and adhering to the walls of the charging equipment were flushed into the autoclave with 100 parts of water, making a total of 200 parts of water. All materials were charged to the autoclave without admitting air. As rapidly as possible thereafter, 73 parts of liquid butadiene was added to the autoclave under nitrogen pressure, the autoclave quickly sealed and brought to 50° C., the reaction mixture being agitated with an anchor-type stirrer so as to form an emulsion. When the polymerization reaction had reached approximately 70 percent conversion, 0.4 part of a shortstopping agent (2,5-di-tert-butylhydroquinone) in a 25 percent aqueous dispersion acidified to a pH of about 4, was injected into the reaction mixture. The latex emulsion was agitated for approximately one-half hour to insure complete admixture of the shortstopping agent and termination of the polymerization reaction. Unreacted monomers and some water were then removed by vacuum distillation. This produced a latex having a solids content of 39.4 percent. (As used herein, solids content refers to the weight of dry solids based on the total weight of the latex or emulsion.) Concentrated (28 percent) ammonium hydroxide was added to the latex until a pH of about 8.0 was reached. To the ammoniated latex was added 0.5 part by weight of an auxiliary stabilizer consisting of a 25 percent solution of a commercial grade of mixed sodium salts of sulfate monoesters of lauryl and myristyl alcohols, per 100 parts by weight of dry solids.

To this latex was then added a master compounding dispersion which contained proportionate amounts of the essential compounding ingredients so that the resultant concentration of each in the latex, based on the dry weight of the solids present, was: two parts by weight of elemental sulfur, two parts by weight of zinc oxide, one-half part by weight of an accelerator, zinc dimethyldithiocarbamate, and two parts by weight of an antioxidant, 2,2'-methylene-bis-(4-methyl-6-tert-butyl phenol). The compounded latex was then aged 24 hours and filtered between two layers of cheese cloth. A clean stainless steel plate held in a vertical position was then slowly dipped into a bath of the compounded latex, and removed slowly so as to deposit a thin and uniform layer of latex compound on the plate. The plate with the deposited compounded latex film thereon was thereafter dipped into a coagulant bath consisting of a 50 percent solution of calcium nitrate tetrahydrate in acetone. The plate was allowed to remain or dwell in the coagulant bath for a brief period of about 15 seconds and thereafter removed slowly and uniformly. The solvent in the coagulant was allowed to evaporate by air drying. The plate with deposited compounded latex film and deposited coagulant was then dipped into the original bath of latex where it was allowed to remain for a period of about three minutes. The plate was dipped again in the coagulant bath, removed from this bath and dried for about two hours at 150° F., cured in air for about 30 minutes at 320° F. and cured and leached in water at 210° F. for about 30 minutes. The film so prepared was then stripped from the plate and air dried at about 150° for a period of about 8 hours. The film so prepared had the properties given in the following Table I under the notation, film No. 127–B. Film No. 174–C was similarly prepared except that 1.0 part of n-dodecyl mercaptan was used in the polymerization of the latex. This film had properties similar to film No. 127–B.

As reported in Table I, the films thus prepared were readily stretched, as shown by the high ratios of the gum tensile strength to the modulus at 300 percent elongation (4.8 and 5.4). The extent of the easy stretchability, as well as the relatively high elongation at break, of these films becomes apparent when they are compared with films Nos. 49–C and 49–D in Table I, which were prepared and tested in the same manner except for the use of conventional amounts of the same catalyst (0.5 and 1.0 part) in the polymerization recipe. As reported in Table I, the film (49–C) prepared from latex polymerized with 0.5 part of potassium persulfate and 2.0 parts of modifier had a high 300 percent modulus. The use of even 3.0 parts of modifier (note film No. 49–D) did not sufficiently Table I.—*Properties of films deposited from latex of polymer from butadiene (73%) acrylonitrile (20%) and methacrylic acid (7%), using varying amounts of catalyst and of n-dodecyl mercaptan* [1]

| Film No. | Catalyst $K_2S_2O_8$, Parts [3] | Modifier DDM [2], Parts [3] | Modulus at 300% Elongation, p.s.i. | Ultimate Gum Tensile Strength, p.s.i. | Elongation at break, percent | Ratio of Ultimate Tensile, 300% Modulus |
|---|---|---|---|---|---|---|
| 174–C | 0.05 | 1.0 | 817 | 4,365 | 540 | 5.4 |
| 127–B | 0.05 | 2.0 | 815 | 3,665 | 520 | 4.5 |
| 49–C | 0.5 | 2.0 | 2,196 | 4,050 | 410 | 1.8 |
| 49–D | 1.0 | 3.0 | 1,417 | 3,360 | 435 | 2.4 |

[1] Composition of polymer based on monomer charge in weight percent.
[2] DDM=n-dodecyl mercaptan.
[3] Parts by weight based on 100 parts of total monomer charge.
All films were between 0.010 to 0.018 inch thick.

reduce the 300 percent modulus even though there was a considerable reduction in gum tensile strength. Furthermore, latices prepared using 0.5 to 1.0 part of catalyst and 2 or more parts of modifier frequently gelled to an unusable state on neutralization, this condition becoming more serious as the amount of modifier was increased. The ratios of gum tensile strength to 300 percent modulus of the films prepared from latices polymerized using the lower amount of catalyst were twice as great as the ratios of the films from latices polymerized using the higher and conventional amounts of catalyst. This effect was achieved, in film No. 174–C, without sacrifice of high gum tensile strength. Additionally, this effect was achieved without loss in the excellent oil-resistance of films made from latices polymerized with standard high concentrations of catalyst.

Tests on films prepared in a similar manner to that used in preparing film No. 174–C but using 20 and 30 percent solutions of calcium tetranitrate in acetone indicated that such concentrations were effective in producing strong films having somewhat lower moduli. Both of such films had desirably high ratios of gum tensile strength to 300 percent modulus of over 5.

EXAMPLE II

A number of films were prepared from latices polymerized using varying amounts of catalyst and modifier, using the polymerization, neutralization, compounding and dipping techniques and monomer charge described in Example I. The physical properties of these films are reported in Table II. Films Nos. 99–B and 115–B are duplicates of films Nos. 127–B and 174–C except that a total of 100 parts of water was used in the polymerization recipe of the latex for 99–B and the latex for 115–B was polymerized at 60° C.

As can be seen from inspection of Table II, each of the films prepared from latex polymerized with 0.05 part of potassium persulfate or less, had a 300 percent modulus less than 800 p.s.i. Relatively high amounts of modifier (2.5 parts with 0.025 part of catalyst and 3.0 parts with 0.050 part of catalyst) resulted in desirably low 300 percent moduli but with some loss in gum tensile strength (note films Nos. 137–C and 99–A). However, when from 1 to 2 parts of modifier were used with 0.025 part of catalyst and from 1.5 to 2.5 parts with 0.05 part of catalyst, 300 percent moduli below 800 p.s.i. and gum tensile strengths of over 3300 p.s.i. were observed in the final films. It is also apparent from the data in Table II that, by proper selection of the amount of modifier and the use of amounts of potassium persulfate less than 0.1 part per 100 parts of total monomeric material, latices can be prepared which yield films having ratios of the 300 percent modulus to gum tensile strength of about 5 or higher.

Films produced as described above from acidic polymers produced in the same polymerization system using 0.075 part of potassium persulfate but only 0.25 and 0.5 part of n-dodecyl mercaptan had 300 percent moduli of approximately 1000 p.s.i. and gum tensile strengths of over 4300 p.s.i. In contrast, a film identically prepared, except that the polymerization system contained no modifier, had a gum tensile strength of only 1920 p.s.i. and a 300 percent modulus of 1005 p.s.i. and hence a ratio of these properties of 1.9. It is therefore apparent that some modifier is necessary in the production of films having relatively high stretchability and high gum tensile strength.

The data on films Nos. 141–A, 127–F and 137–D show that latex produced using sulfhydryl compounds other than n-dodecyl mercaptan can be processed to yield films having good stretchability. As shown by these data, the tertiary mercaptans exert more modifier action than comparable normal mercaptan to achieve desired modifying action.

These films have high oil-resistance as shown by the following data.

| Film No. | Volume Increase after 1 week in Immersion in Stated Oil at 100° F. | | |
|---|---|---|---|
| | ASTM #1 | ASTM #3 | Lard Oil |
| 99–A | 5.4 | 37.2 | 40.4 |
| 99–B | 7.0 | 32.8 | 35.8 |
| Buna N [1] | 5.4 | 32 | 34 |
| Neoprene | 11.5 | 107 | 92 |
| Natural rubber | 138 | 309 | 171 |

[1] A commercial 70 percent butadiene, 30 percent acrylonitrile polymer which had a gum tensile strength of 400 p.s.i.

The Buna N, neoprene, and natural rubber samples referred to in the above data were deposited latex films of thickness comparable to films Nos. 99–A and 99–B. The lard oil used contained 7–8 percent of free fatty acids. Resistance to such lard oil is indicative of resistance to body oils.

EXAMPLE III

Latices were prepared from monomer charges containing various amounts of butadiene, acrylonitrile and methacrylic acid, using the polymerization technique described in Example I, but with a different type of stirring, 0.05 part of potassium persulfate being used as catalyst and 0.5 or 1.0 part of n-dodecyl mercaptan as

*Table II.—Properties of films deposited from latex of polymer from butadiene (73%), acrylonitrile (20%) and methacrylic acid (7%) using varying amounts of catalyst and modifier* [1]

| Film No. | Catalyst $K_2S_2O_8$, Parts [2] | Modifier Parts [2], DDM [3] | Modulus at 300% Elongation, p.s.i. | Ultimate Gum Tensile Strength, p.s.i. | Elongation at break, percent | Ratio of Ultimate Tensile, 300% Modulus |
|---|---|---|---|---|---|---|
| 137–C | 0.025 | 2.5 | 317 | 1,995 | 685 | 6.3 |
| 137–AN | 0.025 | 2.0 | 417 | 3,365 | 690 | 8.1 |
| 137–E | 0.025 | 1.0 | 685 | 4,125 | 490 | 6.0 |
| 99–A | 0.05 | 3.0 | 275 | 2,400 | 725 | 8.7 |
| 127–A | 0.05 | 2.5 | 575 | 3,665 | 575 | 6.4 |
| 99–B | 0.05 | 2.0 | 400 | 3,300 | 650 | 8.3 |
| 127–C | 0.05 | 1.5 | 765 | 3,650 | 525 | 4.8 |
| 115–B | 0.05 | 1.0 | 700 | 4,500 | 485 | 6.4 |
| 174–B | 0.075 | 1.0 | 867 | 5,365 | 540 | 6.2 |
| 115–C | 0.1 | 2.0 | 708 | 2,450 | 510 | 3.5 |
| 115–E | 0.1 | 1.0 | 842 | 3,700 | 535 | 4.4 |
| | | MTM [4] | | | | |
| 141–A | 0.025 | 1.5 | 742 | 3,290 | 540 | 4.4 |
| | | Sulfole [5] | | | | |
| 137–F | 0.025 | 1.5 | 517 | 2,300 | 575 | 4.4 |
| 137–D | 0.025 | 1.0 | 692 | 3,200 | 550 | 4.6 |

[1] Composition of polymer based on monomer charge in weight percent.
[2] Parts by weight based on 100 parts of total monomer charge.
[3] DDM = n-dodecyl mercaptan.
[4] MTM = mixed tertiary $C_{12}$ to $C_{16}$ mercaptans.
[5] Sulfole = tert-dodecyl mercaptan.
All films are between 0.010 to 0.018 inch thick.

modifier. Films were prepared from these latices after neutralization, as described above, and were tested with the results shown in Table III.

The data in Table III indicate that films prepared from polymers made from monomer charges having a wide range of acrylonitrile content (10 to 40 percent) gave relatively low modulus films and that low concentrations of methacrylic acid (2 to 5 percent) in the monomer charge were particularly effective in producing polymers whose films had desirably high ultimate tensile strengths and unusually low 300 percent moduli relative thereto. The films made from copolymers polymerized from monomer charges having combined acrylonitrile and methacrylic acid concentrations of about 20 to 25 percent or more have oil-resistance equal or superior to neoprene (polymerized chlorobutadiene). Thus, films 137–A and 137–B, containing 30 percent of acrylonitrile based on the monomer charge, show only about half or less of the volume increase shown by neoprene when the films are tested by standard methods in ASTM #1 oil, ASTM #3 oil or lard oil. Films Nos. 137–C and 137–D show even higher oil-resistance as evidenced by lower volume increase in the oils specified.

Table III.—*Properties of films deposited from latices of polymers made from varying amounts of butadiene, acrylonitrile and methacrylic acid* [1]

| Film No. | Composition of Polymer [2] | | | Modulus at 300% Elongation, p.s.i. | Ultimate Gum Tensile Strength, p.s.i. | Elongation at break, percent | Ratio of Ultimate Tensile, 300% Modulus |
|---|---|---|---|---|---|---|---|
| | BD | AN | MAA | | | | |
| 54-C [3] | 85 | 10 | 5 | 770 | 3,975 | 550 | 5.2 |
| 54-D [3] | 87 | 10 | 3 | 333 | 3,245 | 690 | 9.8 |
| 11-A [4] | 77 | 20 | 3 | 445 | 3,010 | 680 | 6.8 |
| 11-B [4] | 72 | 25 | 3 | 500 | 2,770 | 680 | 5.5 |
| 137-A [5] | 67 | 30 | 3 | 450 | 3,175 | 695 | 7.1 |
| 137-B [5] | 68 | 30 | 2 | 300 | 2,665 | 870 | 8.9 |
| 137-C [5] | 62 | 35 | 3 | 475 | 3,875 | 740 | 8.2 |
| 137-D [5] | 63 | 35 | 2 | 300 | 2,620 | 860 | 8.7 |
| 154-D [5] | 57 | 40 | 3 | 460 | 3,700 | 720 | 8.1 |
| 154-A [5] | 57 | 40 | 3 | 510 | 4,940 | 680 | 9.7 |

[1] Catalyst, 0.05 part by weight of $K_2S_2O_8$.
[2] Based on monomer charge; BD=butadiene, AN=acrylonitrile, MAA=methacrylic acid.
[3] Modifier, 0.5 part by weight of n-dodecyl mercaptan.
[4] Modifier, 1.0 part by weight of n-dodecyl mercaptan.
[5] Modifier, 0.1 part by weight of n-dodecyl mercaptan.
All films were between 0.010 to 0.018 inch thick.

The greater elasticity of the copolymer resulting from the use of low catalyst concentrations becomes apparent when the properties of film No. 137–A are contrasted with the following properties of a film prepared from a polymer polymerized from a monomeric charge of identical composition but in the presence of 0.5 part of potassium persulfate and 0.5 part of mixed tertiary $C_{16}$ mercaptans:

300 percent modulus _____ p.s.i.__ 792
Ultimate tensile strength _____ p.s.i.__ 1005
Elongation at break _____ percent__ 350

The data on film No. 154–A show that preparation of the latex in systems having very low modifier concentrations (0.1 part) is of particular advantage when the monomer charge contains a small amount of methacrylic acid (3 percent).

Films prepared from latices produced from monomer charges containing 10 percent of methacrylic acid demonstrated that low catalyst concentration (0.05 part of $K_2S_2O_8$) systems yielded polymers which, when cured, had considerably superior ratios of gum tensile strength to 300 percent modulus when compared to similarly cured polymers produced in high catalyst concentration systems. However, the 300 percent moduli of films prepared from polymers made from monomer charges containing 10 percent methacrylic acid were high and it is therefore desirable to use less than 10 percent, such as about 8 percent or less, when a 300 percent modulus of substantially less than 1000 p.s.i. is desired.

EXAMPLE IV

Latices were prepared using the monomer charge and technique described in Example I with 0.05 part of potassium persulfate as catalyst and varying amounts of modifier. These latices were compounded with varying amounts of zinc oxide and elemental sulfur and were used to prepare films, as described in Example I.

The results in Table IV indicate that the gum tensile strengths of polymers prepared in systems with high modifier concentrations (3 parts) are improved when relatively small amounts of zinc oxide and sulfur are employed in compounding. In all instances, a desirably high ratio of gum tensile strength to 300 percent modulus is maintained, showing that the properties of the final film can be varied to suit a variety of end uses, without loss of relative stretchability.

EXAMPLE V

A latex was prepared from a monomer charge of 73 parts of butadiene, 20 parts of acrylonitrile and 7 parts of methacrylic acid, using a polymerization system and technique similar to that described in Example I but employing only 75 parts of water and 0.5 part of n-dodecyl mercaptan. This yielded a latex having a dry solids content of 55.3 percent, after stripping. This latex was compounded and dipped as described in Example I except that the dipping form was not coated with calcium nitrate solution nor was the deposited latex film dipped into the calcium nitrate bath.

Table IV.—*Properties of films compounded with varying amounts of metallic oxide and sulfur using polymers of butadiene (73%), acrylontrile (20%), methacrylic acid (7%)* [1]

| Film No. | Modifier (DDM) [2], parts | Compounding [3] | | Modulus at 300% Elongation, p.s.i. | Ultimate Gum Tensile Strength, p.s.i. | Elongation at break, percent | Ratio of Ultimate Tensile, 300% Modulus |
|---|---|---|---|---|---|---|---|
| | | ZnO | S | | | | |
| 99-A | 3.0 | 2 | 2 | 275 | 2,400 | 725 | 8.7 |
| 116-D | 3.0 | 1 | 1 | 392 | 2,915 | 700 | 7.6 |
| 99-B | 2.0 | 2 | 2 | 400 | 3,300 | 650 | 8.3 |
| 116-B | 2.0 | 1 | 1 | 308 | 2,525 | 700 | 8.2 |
| 116-A | 2.0 | 1 | 0 | 292 | 2,285 | 700 | 7.8 |
| 115-B | 1.0 | 2 | 2 | 700 | 4,500 | 485 | 6.4 |
| 116-F | 1.0 | 1 | 1 | 483 | 3,463 | 600 | 7.2 |

[1] Based on monomer charge; catalyst 0.05 part by weight of $K_2S_2O_8$.
[2] DDM=n-dodecyl mercaptan in parts by weight per 100 parts by weight of total monomers.
[3] In parts per 100 parts of dry solids.
All films were between 0.010 to 0.018 inch thick.

This procedure produced a film having a 300 percent modulus of 570 p.s.i., an ultimate tensile strength of 3370 p.s.i., and an elongation at break of 500 percent. The ratio of ultimate tensile strength to 300 percent modulus of 6.1 demonstrated the easy stretchability of the film.

This film indicated that the cross linking of the polymer through carboxyl groups achieved solely by the zinc oxide (2 parts) present in the film was adequate, in conjunction with the vulcanization effected by the sulfur present, to produce a strong film.

The above examples have concerned a specific combination of monomers which produced copolymers which, when cured as described, have an unusual combination of properties; the combination of oil-resistance with relatively good stretchability (relatively low modulus) and high gum strength. These properties, with some variation, are manifested in cured copolymers or elastomers produced from monomeric charges having a major portion (typically from about 50 to almost 90 weight percent) of butadiene, a lesser portion (typically from about 10 to 45 weight percent) of acrylonitrile, and a minor and smaller portion (typically from more than 1 to about 10 weight percent) of methacrylic acid when the monomers are polymerized in the presence of the stated low concentrations of a peroxygen catalyst and a selected amount of modifier.

A similar combination of properties, again with some variations, can be achieved by substituting, for the monomers previously referred to, other monomers of a similar nature in the low catalyst concentration polymerization systems described herein. Such substitution is preferably on a molecular basis. Preferred compositions fall in the molecular ranges equivalent to the weight ranges referred to immediately above (i.e., a major portion, about 50 to 90 moles of butadiene, about 10 to 46 moles or from about one-tenth to less than half of acrylonitrile and about 1 to 7 moles or from about one-hundredth to one-fourteenth of methacrylic acid, per 100 moles of total monomer charge). Suitable substitutents are as follows: for butadiene, other low molecular weight polymerizable 1,3 diene hydrocarbons, such as those having from 4 to 6 carbon atoms; for acrylonitrile, another low molecular weight polymerizable olefinically unsaturated nitrile, such as methacrylonitrile, for methacrylic acid, other low molecular weight polymerizable unsaturated carboxylic acids, such as acrylic acid and ethacrylic acid. The use of the low catalyst concentration polymerization systems described herein for the production of such copolymers results in the production of copolymers which, when properly cross-linked or cured as described herein, have unusually high gum tensile strengths relative to their moduli at 300 percent elongation and hence have excellent stretchability when compared with copolymers of similar composition but polymerized in high catalyst concentration systems.

When it is desired to have the 300 percent modulus of the film less than about 1000 p.s.i. it is generally preferable to use 5 mole percent or less of the polymerizable unsaturated carboxylic acid in the monomer charge (e.g., about 8 weight percent or less of methacrylic acid). Reduction of the amount of such a monomer in the monomer charge reduces the 300 percent modulus, other conditions being equal.

Although the present invention has been described with particularity with reference to preferred embodiments and various modifications thereof, it will be obvious to those skilled in the art, after understanding the invention, that various changes and other modifications may be made therein without departing from the spirit and scope of the invention and the appended claims should therefore be interpreted to cover such changes and modifications.

We claim as our invention:

1. In the preparation of latex that forms a readily-stretched, strong elastic film from monomeric material comprising a major portion of a conjugated diene having four to six carbon atoms, a lesser portion of a lower molecular weight olefinically unsaturated nitrile and a minor portion of an alpha-unsaturated acrylic acid having three to five carbon atoms, the steps which comprise polymerizing said monomeric material emulsified in an acidic aqueous system with an emulsifier selected from the group consisting of anionic and non-ionic emulsifiers and in the presence of, based on 100 parts by weight of total monomeric material, between 0.025 and 0.075 part by weight of potassium persulfate and an amount of a mercaptan modifier equivalent to about 0.1 to 2 parts by weight of primary dodecyl mercaptan, neutralizing the polymer emulsion so formed with a volatile monovalent base and compounding the neutralized emulsion with an insoluble basic oxide of a polyvalent metal.

2. The steps of claim 1 in which the conjugated diene is 1,3-butadiene.

3. The steps of claim 1 in which the low molecular weight olefinically unsaturated nitrile is acrylonitrile.

4. The steps of claim 1 in which the low molecular weight acrylic acid is methacrylic acid.

5. In the preparation of a readily-stretched, strong elastic film from an acidic polymer emulsion prepared from a major portion of a conjugated diene hydrocarbon having from four to six carbon atoms, a lesser portion of a low molecular weight olefinically unsaturated nitrile and a minor portion of an alpha-unsaturated acrylic acid having from three to five carbon atoms, said polymer being emulsified in an aqueous system with an emulsifier selected from the group consisting of an ionic and non-ionic emulsifiers, the steps which comprise neutralizing said polymer emulsion with a volatile monovalent base, compounding the neutralized polymer emulsion with a basic oxide of a polyvalent metal substantially insoluble therein, depositing a film of the compounded polymer emulsion on a dipping form, and curing said film by condensation of the major portion of the carboxyl groups of the polymer with cations of said polyvalent metal.

6. A compounded latex comprising an aqueous suspension of salt formed by a volatile monovalent base and an acidic elastomer produced by polymerization, in an acidic system containing between 0.025 to 0.075 part by weight of potassium persulfate per 100 parts by weight of total monomeric material and an amount of mercaptan modifier equivalent to between about 0.1 to 2 parts by weight of primary dodecyl mercaptan, of monomeric material emulsified with an emulsifier selected from the group consisting of anionic and non-ionic emulsifiers and comprising a major portion of 1,3-butadiene, between 10 to 45 parts of acrylonitrile and 1 to 8 parts of methacrylic acid, and an intimately admixed finely divided basic oxide of a polyvalent metal, said oxide being substantially insoluble in said latex.

References Cited in the file of this patent

UNITED STATES PATENTS

| | | |
|---|---|---|
| 2,535,557 | Walton | Dec. 26, 1950 |
| 2,600,679 | Park | June 17, 1952 |
| 2,604,668 | Miller et al. | July 29, 1952 |
| 2,669,550 | Brown | Feb. 16, 1954 |
| 2,724,707 | Brown | Nov. 22, 1955 |